Feb. 18, 1969            E. R. ATKINS, JR            3,428,127
METHOD FOR INCREASING THE RECOVERY OF OIL
FROM WATER-SENSITIVE FORMATIONS
Filed Dec. 28, 1966
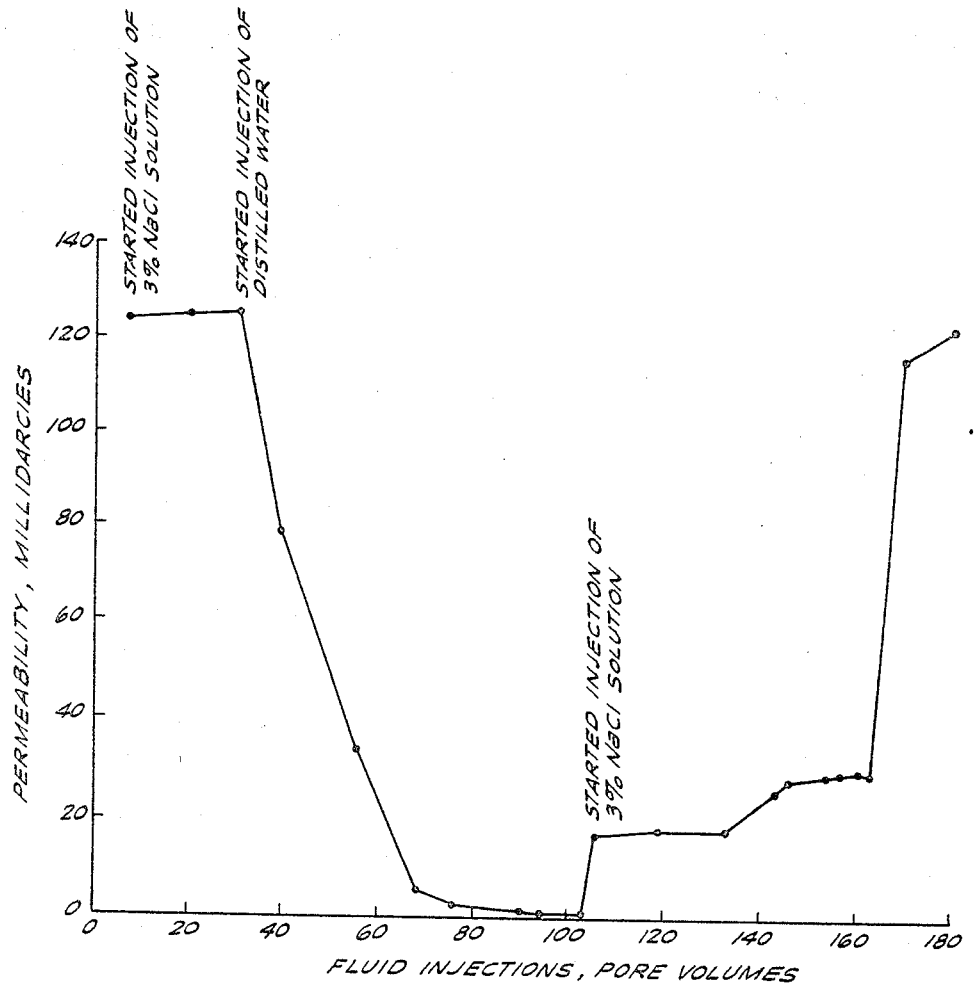
INVENTOR.
EARLE R. ATKINS JR.
BY
Dean Sandford
ATTORNEY

United States Patent Office 3,428,127
Patented Feb. 18, 1969

3,428,127
METHOD FOR INCREASING THE RECOVERY OF OIL FROM WATER-SENSITIVE FORMATIONS
Earle R. Atkins, Jr., Whittier, Calif., assignor to Union Oil Company of California, Los Angeles, Calif., a corporation of California
Filed Dec. 28, 1966, Ser. No. 605,268
U.S. Cl. 166—274
Int. Cl. E21b 43/20
9 Claims

ABSTRACT OF THE DISCLOSURE

A method of recovering oil from a water-sensitive petroleum reservoir by water flooding which comprises injecting low-salinity water through an injection well and into the oil-bearing formation until the clays and other water-sensitive constituents of the formation are sufficiently hydrated to effect a substantial reduction in the permeability of the reservoir, and thereafter injecting saline water into the formation to drive the bank of low-salinity water and hydrated earth particles through the formation so as to displace oil toward a spaced production well. Still further quantities of oil can be recovered by periodically interrupting the injection of saline water and injecting additional volumes of low-salinity water.

---

This invention relates to a process for increasing the recovery of oil from water-sensitive oil-bearing formations, and more particularly to an improved process for water flooding a partially depleted water-sensitive petroleum reservoir so as to recover an increased quantity of oil therefrom.

An initial portion of the oil present in a petroleum reservoir can usually be produced by primary recovery methods utilizing natural reservoir energy in the form of water or gas existing under sufficient pressure to drive the oil from the reservoir to a production well completed in the reservoir. Unfortunately, this natural reservoir energy is usually depleted long before all of the oil present in the reservoir has been recovered. Accordingly, secondary recovery methods whereby energy is added to the reservoir from outside sources so as to effect additional oil recovery are practiced in those reservoirs initially having insufficient native energy to achieve oil production or in which the reservoir energy becomes depleted before the oil is completely recovered.

The technique of water flooding is one well-known method for increasing the recovery of oil from a depleted or partially depleted reservoir having insufficient natural energy to continue economical production by primary methods. In general, this process consists of injecting an aqueous displacement fluid through one or more injection wells under sufficient pressure that the fluid enters the oil-bearing formation and flows toward one or more spaced production wells. As the flooding medium passes through the formation it displaces the residual oil therein and carries it to the producing well from which it is recovered by conventional means. In order to insure that the flooding medium advances through the formation to the production well with a more or less uniform front, rather than in the form of fingers extending through the strata of highest permeability, it has been proposed that the viscosity of at least the forward portion of the flooding medium be adjusted so that the mobility of the flood front is in the order of, or lower than, that of the oil to be recovered. This has been accomplished by adding a viscosity-increasing, or thickening agent to at least the initial portion of the flooding medium. Fatty acid soaps, alginates, sucrose, glycerine, carboxymethyl cellulose and various water-soluble polymers such as polyacrylamide, polyvinyl and polyallyl alcohols, and the like, have been suggested for use as thickening agents in aqueous flooding media.

The permeability of the reservoir rock is an important factor in flooding operations. In general, the permeability of the reservoir should be sufficient to permit the injection of water into the reservoir at an economical rate. In shallow reservoirs, particularly, a high permeability is required so that the formation is not fractured at the required injection pressure. In addition to the inherent permeability of the formation being flooded, the permeability of the formation can be affected by clay materials which are present as natural constituents of the formation. It is known that certain clays commonly found in many earth structures, such as the illites and montmorillonites, are susceptible to swelling and dispersion when contacted by fresh water, resulting in a substantial reduction in permeability. The magnitude of this effect is so pronounced that some clay-containing formations are substantially impermeable to fresh water, or are rendered substantially impermeable by contact therewith. Accordingly, it is conventional to conduct water flooding operations of water-sensitive formations with various naturally occurring or specially prepared brines, and preferably with connate water previously withdrawn from the formation, so as to inhibit the plugging tendency of the clayey constituents of the formation when contacted with the flooding medium. Although clay swelling and dispersion can be controlled by the use of a flooding medium containing dissolved salts, these flooding agents have the disadvantage that most of the known thickening or viscosity increasing agents are rendered less effective or wholly ineffective in brine solutions.

It has been recognized that the oil recovery from a clayey formation by water flooding can be advantageously increased by employing fresh water as the flooding medium. However, the aforementioned injectivity problems usually prevent the use of fresh water as the flooding medium in these water-sensitive formations. Various methods of overcoming the injectivity restriction have been proposed. For instance, in Patent No. 3,141,501, it is proposed that water-sensitive formations be flooded with fresh water made acidic with an acid which when neutralized by the basic constituents of the formation forms an insoluble salt. The acidic flood water radiating outwardly into the formation from the injection well does not deleteriously affect the injection rate. Upon neutralization by reaction with the basic constituents of the formation, an insoluble salt is formed which precipitates, resulting in a neutral flood water of low salinity at a distance removed from the injection well. While this method can prove useful in flooding certain reservoirs, it is somewhat costly since the entire flooding medium must be acidized to prevent permeability loss. Further, its utility is primarily applicable to dolomite formations, or other structures containing substantial basic materials reactive with the acid.

While it has been proposed to incorporate a suspension of clay within the water used in a water flooding operation to enhance the effectiveness of the flooding medium, this technique has limited utility in most formations. In theory, the clay coacts with the flood water to form a thixotropic flooding medium effective in improving the displacement of oil from the formation. However, the very property which renders the clay suspension useful as a displacing fluid makes it difficult to inject. The clay suspension tends to plug the formation at the well face and for a distance into the formation rendering further fluid injection difficult without exceeding the pressure at which fractures are formed in the formation. Also, the aqueous clay suspension does not inhibit swelling and dispersion of the natural water-sensitive clayey constituents of the formation. Thus, the aqueous suspension of clay is not a desirable flooding medium in a formation containing water-sensitive clays.

Accordingly, it is an object of the present invention to provide an improved method for water flooding a petroleum reservoir containing water-sensitive clays. Another object is to provide a method for improving the recovery of oil from a water-sensitive petroleum reservoir. A still further object is to provide an improved method for decreasing the mobility of a flood front in a water-sensitive petroleum reservoir. These and related objects of the invention will be apparent to those skilled in the art from the following description.

Briefly, this invention contemplates an improved method for water flooding a water-sensitive petroleum reservoir to effect an increased recovery of oil therefrom. The method of this invention comprises the injection of an initial quantity of low-salinity water through a well and into the formation. The injection of low-salinity water is continued until a substantial reduction in permeability is effected, thereupon the injection of fresh water is discontinued and the bank of injected fresh water displaced into the formation by the subsequent injection of saline water. The saline water injection is continued to displace the bank of low-salinity water through the formation toward one or more spaced production wells. Oil displaced from the reservoir to the production well by the advancing flood front is recovered in conventional manner. As the effectiveness of the low-salinity water bank becomes dissipated, the saline water injection can be interrupted from time to time and an additional volume of low-salinity water injected into the formation.

The method of this invention can be practiced on any water-sensitive petroleum reservoir cotaining recoverable oil. By water-sensitive petroleum reservoir is meant a subterranean oil-bearing earth formation which is effected with a reduced permeability upon contact with low-salt content water. Such water-sensitive formations are exemplified by formations which contain water swellable and/or dispersible clays, such as for example those of the montmorillonite and illite families. These water-sensitive clays and other water-sensitive constituents of the formation are hydrated on contact with water, the degree of the hydration being inversely related to the salinity of the water.

While the exact mechanism by which the injection of low salt content water operates to increase the recovery of oil from a water-sensitive formation is not clearly understood, several possible mechanisms have been proposed. It is known that clays contained in an earth formation occur in the pore spaces between sand particles and are attached to the sand particles. When these clays hydrate and swell, the pore space available to movable liquids probably decreases causing oil and other liquid to be displaced. When it is considered that sodium montmorillonite swells to 20 times its initial volume on contacting fresh water, it is conceivable that this swelling process may fundamentally affect oil recovery.

A second mechanism of clay hydration that may affect oil recovery is attributed to the fact that hydratable clays attract and strongly hold an appreciable amount of water on their surfaces, the amount of adsorbed water being inversely proportional to the salt content of the water. This surface adsorption also reduces the effective pore volume and thereby may affect oil recovery in the water flood process, just as does the swelling phenomenon.

Another mechanism whereby oil recovery from water-sensitive formations can be beneficially affected by flooding with fresh water is based on the known gel-forming tendencies of these materials. It is proposed that clay particles are dislodged from the formation and dispersed in the flooding medium causing an increase in viscosity and a corresponding reduction in mobility. As this viscous material is driven through the formation, it tends to advance in a more uniform flood front than brine or other low-viscosity flooding mediums and thereby more completely displaces oil toward the production well.

No matter what the exact mechanism, or combination of mechanisms, of flooding with low-salinity water may be, and despite any uncertainties as to this mechanism, it has nevertheless been demonstrated that oil recovery from water-sensititve formations can be increased by first injecting low-salinity water into the formation until the permeability of the formation is substantially reduced, and thereafter driving the low-salinity water through the formation with saline water. Although the permeability of the formation to water is substantailly reduced on contact with the low-salinity water, it is subsequently increased by injection of the saline water. Accordingly, a low permeability zone is maintained at the flood front by the hydration of water-sensitive clays in contact with the bank of low-salinity water, and subsequently the permeability of the formation is at least substantially restored by injection of the saline drive medium. In similar fashion, successive spaced zones of low permeability are created and moved through the formation by periodically injecting a slug of low-salinity water into the formation and thereafter continuing to displace the successive spaced banks of low-salinity water through the formation with saline water.

The term "low-salinity water" is meant to include any water having a lower salt content than the connate formation water, and the term "saline water" is meant to include water having a salt content at least about equivalent to the salt content of the connate water. Thus, in its broadest sense, the practice of this invention comprises injecting a quantity of water having a lower salt content than the connate formation water into the formation and thereafter driving the bank of low-salinity water through the formation by injecting saline water having a salt content at least about equivalent to that of the connate water. Since it is known that the naturally occurring connate formation water found in various petroleum reservoirs can vary rather substantially in salt content, some formations containing water which is substantially saturated with various alkali metal and alkaline earth metal salts, the absolute values of salt content of the injected water can similarly vary.

As the magnitude of permeability reduction is dependent at least in part on the difference in salinity between the injected low-salinity water and the connate formation water, it is preferred that the salt content of the injected water be substantially less than the salt content of the connate water. Thus, depending upon the salinity of the connate water, the injected low-salinity water can comprise a low salt content saline water or fresh water. For example, a preferred low-salinity water for injection into many formations can comprise fresh water having a total salt content of less than about 500 p.p.m. Another preferred low-salinity water suitable for injection into substantially any oil-bearing formation, according to the practice of this invention, is a substantially salt-free fresh water. Suitable sources of substantially salt-free water can be found naturally occurring in many localities and in aquafers either above or below the oil-bearing zone, or substantially salt-free water can be obtained from melting snow and ice, or from rain runoff. Also, suitable substantially salt-free water can be produced by distillation or ion exchange.

The volume of low-salinity water to be injected is dependent upon the extent and porosity of the formation, the amount and types of clay present in the structure, and the difference in salt content between the low-salinity water and the connate formation water. In general, a preferred practice is to inject sufficient of the low-salinity water to effect a substantial reduction in the permeability of the formation, and preferably to inject sufficient of the low-salinity water to reduce the formation permeability to less than about 25 percent of the initial permeability as evidenced by a reduction in the amount of water injected under constant injection conditions or by the increase in injection pressure required to maintain a constant injection rate.

In the practice of this invention, the injection and production wells are drilled into the oil-bearing formation and completed therein in conventional manner. These wells can be arranged in any convenient or conventional pattern adapted for conventional water flooding. Similarly, the water injection operation is performed in conventional manner. In the usual case, the low-salinity water injection is injected after the formation has been partially depleted by primary recovery, although it is within the scope of the invention to initiate water injection operations without prior primary recovery. Also, water flooding according to the present invention can be practiced after conventional water flooding, or the low-salinity water can be injected as the initial step of the secondary recovery operation.

The improved water flooding method of this invention is demonstrated by the following examples which are presented by way of illustration, and are not intended as limiting the spirit and scope of the invention as defined by the appended claims.

*Example 1*

The variation in permeability of a water-sensitive formation to successive injections of low-salinity water and saline water is demonstrated by the following injectivity test. A core sample from a water-sensitive Los Angeles Basin formation is mounted in a core holder in conventional manner and initially saturated with a saline solution to simulate field conditions. Saturation is accomplished and initial permeability established by passing 30 pore volumes of an aqueous solution conaining 3 percent by weight sodium chloride through the core. Initial permeability stabilized at about 128 millidarcys. After the initial 30 pore volumes of saline solution is passed through the core, injection of the saline water is discontinued and injection of substantially salt-free distilled water started. Permeability is reduced to about 1.0 millidarcy. After 73 pore volumes of distilled water have passed through the core, the injection of aqueous 3 percent sodium chloride solution is resumed. This saline water is comparable to the connate water existing in the core prior to the injection of distilled water. Even though this injection is interrupted at several points as a matter of convenience, the initial permeability is ultimately restored to the core by the passage of approximately 67 pore volumes of saline water through the core.

The measured permeabilities at constant injection pressure for the successive injections are reported in the following table:

TABLE I.—SIMULATED WATER FLOODING OPERATION

| Type of Flooding Fluid | Cumulative Injection Pore Volumes | $K_w$, md. |
|---|---|---|
| 3% NaCl Solution | 7 | 127 |
|  | 20 | 128 |
|  | 30 | 128 |
| Distilled Water | 38 | 78 |
|  | 55 | 34 |
|  | 68 | 5.2 |
|  | 76 | 2.1 |
|  | 90 | 1.3 |
|  | 95 | 1.0 |
|  | 103 | 1.0 |
| 3% NaCl Solution | 106 | 17 |
|  | 119 | 18 |
|  | 133 | [1] 18 |
|  | 143 | [2] 26 |
|  | 146 | 28 |
|  | 154 | 29 |
|  | 157 | 30 |
|  | 161 | 30 |
|  | 163 | [3] 29 |
|  | 170 | 120 |
|  | 180 | 126 |

[1] Injection discontinued for 2 hours following this injection.
[2] Injection discontinued for 64 hours following this injection.
[3] Injection discontinued for 16 hours following this injection.

These data are illustrated in FIGURE 1 wherein the observed permeability of the core is plotted as a function of the pore volume of liquid injected. The substantial decrease in the permeability of the core on the injection of low-salinity water and the ultimate restoration of the core permeability on injecting saline water is illustrated.

*Example 2*

The improved oil recovery obtainable with the method of this invention is demonstrated by the following test. A core sample from a water-sensitive formation is conventionally mounted in a core holder and saturated with brine containing approximately 3 percent by weight dissolved salts. The brine is then displaced with Los Angeles Basin crude oil having a viscosity of 30 cp. at 70° F. The resulting restored core has an oil saturation of about 0.70 pore volume and a water saturation of about 0.30 pore volume.

A conventional flooding operation is simulated by passing an aqueous salt solution containing about 3 percent by weight sodium chloride through the formation until an equilibrium oil content is established after which no additional oil is produced by subsequent flooding. About 43 percent of the oil-in-place is recovered by conventional flooding, the oil saturation of the core being reduced to about 0.40 pore volume.

Upon completion of the conventional brine flooding operation, sufficient substantially salt-free fresh water is passed through the core so that its permeability is reduced from an initial value of about 90 millidarcys to less than about 5 millidarcys. Flooding with brine is then resumed until a new oil equilibrium is reached as evidenced by an absence of oil in the core effluent. The improved flooding technique results in the recovery of an additional 0.05 pore volume of oil over the amount recovered by conventional water flooding, which represents a recovery of an additional 7 percent of the original oil-in-place.

While particular embodiments of the invention have been described, it will be understood, of course, that the invention is not limited thereto since many modifications can be made and it is intended to include within the invention any such modifications as fall within the scope of the claims.

The invention having thus been described, I claim:

1. A process for water flooding a water-sensitive, oil-bearing formation penetrated by at least one injection well and at least one spaced production well, which comprises:

injecting a volume of low-salinity water through said injection well and into the entire vertical extent of said oil-bearing formation, said low-salinity water having a lower concentration of dissolved salts than the connate formation water and said low-salinity water being injected in an amount sufficient to effect a substantial reduction in the permeability of said formation;

subsequently injecting saline water having a salt content at least about equivalent to that of the connate water through said injection well and into said formation so as to drive the previously injected low-salinity water through said formation and thereby displace oil toward said production well; and withdrawing oil from said production well.

2. The process defined in claim 1 wherein said low-salinity water is fresh water having a dissolved salt concentration of less than about 500 p.p.m.

3. The process defined in claim 1 wherein said low-salinity water is substantially salt-free fresh water.

4. The process defined in claim 1 where said saline water is selected from the group consisting of connate water previously withdrawn from said formation, saline water having a concentration of salts exceeding the salt content of the connate formation water, and substantially saturated brine.

5. The process defined in claim 1 wherein said low-salinity water is injected until the permeability of said formation is reduced to less than about 25 percent of the initial permeability at the start of the low-salinity water injection.

6. The process defined in claim 1 including the additional steps which comprise:
   discontinuing the injection of saline water;
   injecting an additional quantity of said low-salinity water; and
   subsequently resuming the injection of saline water.

7. A process for water flooding a water-sensitive, oil-bearing formation penetrated by at least one injection well and at least one spaced production well, which comprises:
   injecting a volume of fresh water through said injection well and into said formation sufficient to effect a reduction in the permeability of said formation to less than about 25 percent of its initial permeability, said low-salinity water having a lower concentration of dissolved salts than the connate formation water;
   subsequently injecting saline water selected from the group consisting of connate water previously withdrawn from said formation, saline water having a concentration of salts exceeding the salt content of the connate formation water, and substantially saturated brine through said injection well and into said formation so as to drive the previously injected low-salinity water through said formation and thereby displace oil toward said production well; and
   withdrawing oil from said production well.

8. The process defined in claim 7 wherein said fresh water is substantially salt-free.

9. The process defined in claim 7 including the additional steps of:
   discontinuing the injection of said saline water;
   injecting an additional quantity of said low salinity water; and
   subsequently resuming the injection of said saline water.

References Cited

UNITED STATES PATENTS

| 2,941,597 | 6/1960 | O'Brien | 166—42 |
| 3,123,135 | 3/1964 | Bernard et al. | 166—9 |
| 3,141,501 | 7/1964 | Bernard et al. | 166—9 |
| 3,175,610 | 3/1965 | Osoba | 166—9 |
| 3,208,528 | 9/1965 | Elliott et al. | 166—9 X |
| 3,258,071 | 6/1966 | Yu Shen et al. | 166—9 |
| 3,346,047 | 10/1967 | Townsend et al. | 166—9 |

STEPHEN J. NOVOSAD, *Primary Examiner.*